May 16, 1939. G. H. WAY 2,158,807
TRAP TABLE
Filed Aug. 29, 1938
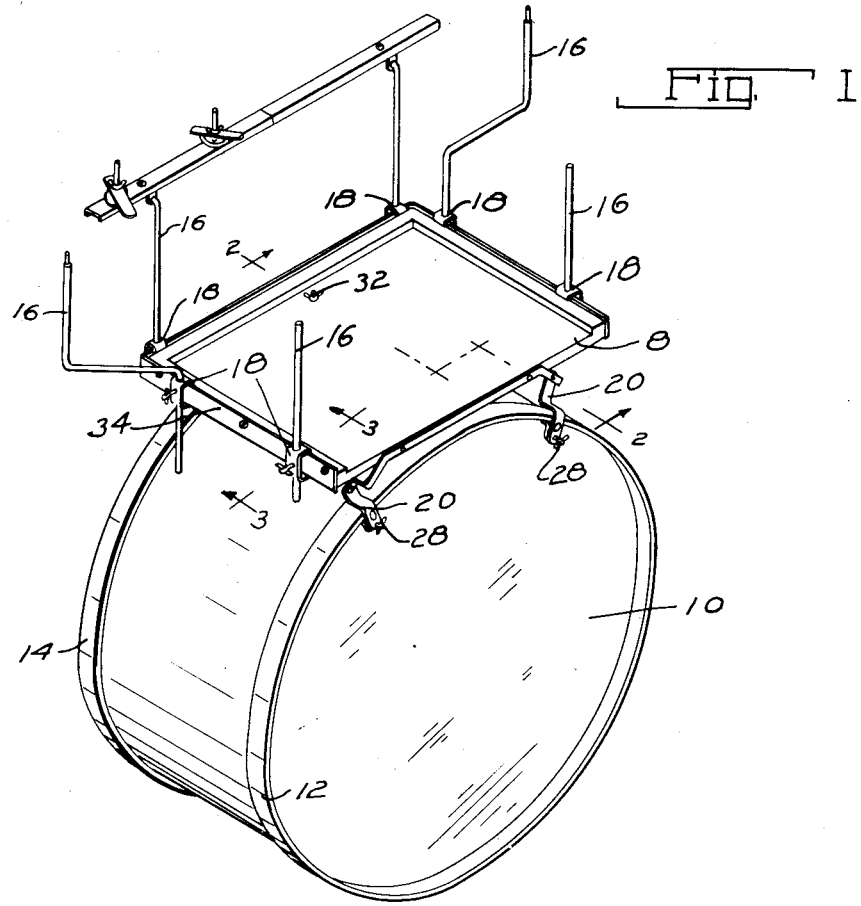
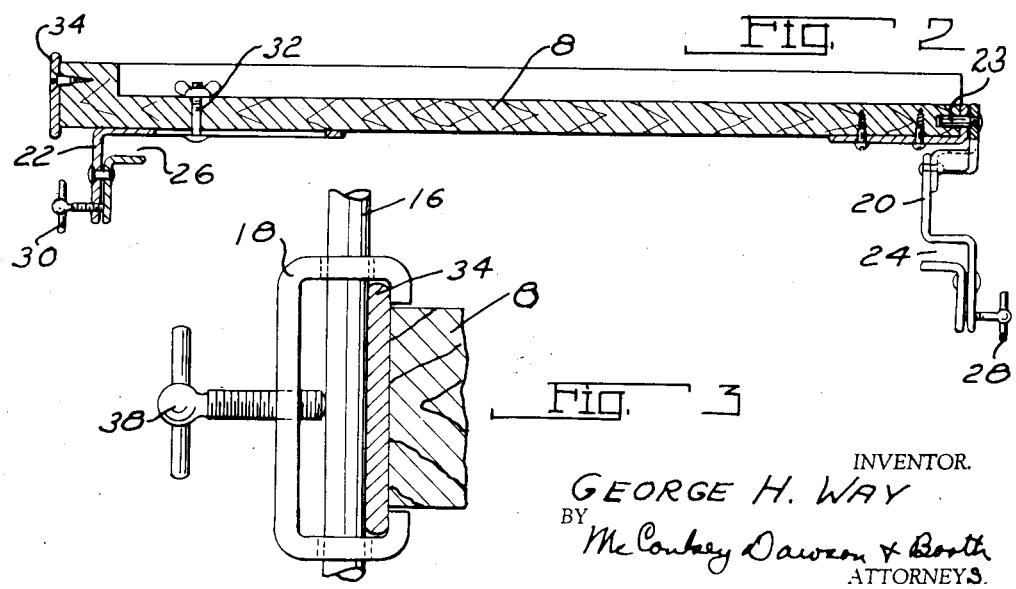
INVENTOR.
GEORGE H. WAY
BY McConkey Dawson & Booth
ATTORNEYS.

Patented May 16, 1939

2,158,807

UNITED STATES PATENT OFFICE 2,158,807

TRAP TABLE

George H. Way, Elkhart, Ind., assignor to C. G. Conn Ltd., Elkhart, Ind., a corporation of Indiana Application August 29, 1938, Serial No. 227,240

8 Claims. (Cl. 84—422)

This invention relates to tables for supporting drummers' traps, and particularly to a trap table designed to be readily mounted on and removed from a bass drum.

An object of the invention is to provide a table carrying one or a plurality of supports for various traps, and which is provided with means for readily adjusting the supports both vertically and about the periphery of the table.

Preferably each of the trap supports has a vertical post passing through alined openings in a clamp member, the ends of the clamp member are hooked over upwardly and downwardly projecting parts of a side rail at the periphery of the table, and a clamp screw can be tightened up simultaneously to clamp the post vertically and to fix the clamp member on the side rail.

Another object of the invention is to provide such a trap table with supports for readily mounting it on a drum, and which permit removal of the drum by loosening a single clamp, and without changing the adjustment of the supports.

The above and other objects and features of the invention, including various novel constructions and desirable particular arrangements, will be apparent from the following description of one illustrative embodiment shown in the accompanying drawing, in which:

Figure 1 is a perspective view of the trap table, with the trap supports, mounted on a bass drum;

Figure 2 is a section through the table on the line 2—2 of Figure 1; and

Figure 3 is a partial section on the line 3—3 of Figure 1, showing one of the clamp members in side elevation.

In Figure 1 the trap table 8 is shown mounted on a bass drum 10, two of the hoops of which are shown at 12 and 14. A plurality of trap supporting posts 16 are shown adjustably on the table 8 by means of clamps 18.

The trap table 8 has attached thereto (as seen in Fig. 2) support members 20 and 22 having jaws 24 and 26 to be operated by clamp screws 28 and 30 for attachment to the hoops 12 and 14 of the drum.

The support member 22 is fastened to the table 8 by means of a screw 32 provided with a wing nut. The screw 32 passes through a hole in the table 8 and a slot in the support member 22. Thus the support member may be readily attached to and adjusted to accommodate various sizes of drums.

The front clamps or supports 20 are provided with horizontal dowel pins 23 fitting into sockets in the forward edge of the table. Thus, by loosening the clamp screw 30, the entire table may be removed from the drum by moving it rearwardly off the dowel pins 23, without changing the adjustment of any of the supports.

The trap table has fastened at one or more of its edges a side rail 34 extending above and below the surfaces of the table. The side rails are adapted to receive the post supporting clamps 18 as more readily seen in Figure 3.

The clamps 18 are shown as each comprising a generally C-shaped body portion having two vertically-alined holes substantially larger than the diameter of the posts 16 adapted to receive the lower portion of one of the posts 16. A clamp screw 38 is shown threaded into the body of the clamp at right angles to the axis of the holes and is in such a position as to engage the post 16 when it is inserted.

In fastening one of the posts 16 to the table 8 the screw 38 on the body of the clamp 18 is loosened and the clamp body is slid into position with its upper and lower hooked parts engaging the inner sides of the side rail. The lower part of the corresponding post 16 is then placed through the holes 36 to the vertical position desired and the screw 38 is tightened to clamp the post 16 against outer face of the side rail, with a reactionary force clamping the ends of member 18 against the inner face of the side rail. In this manner the posts 16 may be attached in any desired position readily as well as disassembled easily.

While only one illustrative embodiment has been shown and described it is not intended to limit the scope of the invention to this particular form nor otherwise than by the terms of the appended claims.

I claim:

1. A trap table having clamping means constructed and arranged to grip a drum hoop for supporting it horizontally on a bass drum and which is provided at its periphery with a side rail extending above and below the table, in combination with a trap support comprising a vertical post, a generally C-shaped clamp member extending vertically across the outer face of said rail and having at its upper and lower ends parts hooked over the upwardly and downwardly projecting portions of said side rail and formed with vertically alined openings through which said post passes between the outer face of said side rail and the inner face of the clamp member, and a clamp screw threaded through the clamp member and engaging said post at its end and operable to clamp said post against vertical movement and simultaneously to fix the clamp member in place on said side rail.

2. A trap table provided at its periphery with a side rail extending above and below the table, in combination with a trap support comprising a vertical post, a generally C-shaped clamp member extending vertically across the outer face of said rail and having at its upper and lower ends parts hooked over the upwardly and downwardly projecting portions of said side rail and formed with vertically alined openings through which said post passes between the outer face of said side rail and the inner face of the clamp member, and a clamp screw threaded through the clamp member and engaging said post at its end and operable to clamp said post against vertical movement and simultaneously to fix the clamp member in place on said side rail.

3. A trap table having clamping means constructed and arranged to grip a drum hoop for supporting it horizontally on a bass drum and which is provided at its periphery with a side rail extending above and below the table, in combination with a trap support comprising a vertical post, a generally C-shaped clamp member extending vertically across the outer face of said rail and having at its upper and lower ends parts hooked over the upwardly and downwardly projecting portions of said side rail and formed with vertically alined openings through which said post passes between the outer face of said side rail and the inner face of the clamp member, and a clamp screw threaded through the clamp member and engaging said post at its end and operable to clamp said post against vertical movement and simultaneously to fix the clamp member in place on said side rail, said openings being substantially larger than the post, whereby tightening the screw clamps the post against the outer side of said rail where it serves to take the reaction of the hooked parts engaging the opposite side of said rail.

4. A trap table provided at its periphery with a side rail extending above and below the table, in combination with a trap support comprising a vertical post, a generally C-shaped clamp member extending vertically across the outer face of said rail and having at its upper and lower ends parts hooked over the upwardly and downwardly projecting portions of said side rail and formed with vertically alined openings through which said post passes between the outer face of said side rail and the inner face of the clamp member, and a clamp screw threaded through the clamp member and engaging said post at its end and operable to clamp said post against vertical movement and simultaneously to fix the clamp member in place on said side rail, said openings being substantially larger than the post, whereby tightening the screw clamps the post against the outer side of said rail where it serves to take the reaction of the hooked parts engaging the opposite side of said rail.

5. A trap table provided at its periphery with a side rail extending above and below the table and having sockets extending inwardly from its forward edge, a pair of supports adapted to be mounted on a drum and having dowel pins detachably seating in said sockets, another support adjustably mounted at the rear of the table and constructed to be detachably clamped to the rear hoop of the drum, a generally C-shaped clamp member extending vertically across the outer face of said rail and having at its upper and lower ends parts hooked over the upwardly and downwardly projecting portions of the side rail and formed with vertically alined openings, a trap support comprising a vertical post smaller in diameter than and adjustably passing through said openings, and a clamp screw threaded through the clamp member and engaging said post at its end and operable to clamp said post against vertical movement and simultaneously to fix the clamp member in place on said side rail.

6. A trap table provided with sockets extending inwardly from its forward edge, a pair of supports adapted to be mounted on a drum and having dowel pins detachably seating in said sockets, and another support adjustably mounted at the rear of the table and constructed to be detachably clamped to the rear hoop of the drum.

7. A trap table formed with sockets in its forward edge and provided with three supports, each having at its lower end a clamp detachably engageable with the hoop of a drum, two of the supports being adapted to engage the front hoop of the drum and having at their upper ends pins detachably seating in said sockets, and the third support being adapted to engage the rear hoop of the drum and having at its upper end means attaching it to the table and permitting adjustment on the table widthwise thereof.

8. A trap table formed with sockets in its forward edge and provided with three supports, each having at its lower end a clamp detachably engageable with the hoop of a drum, two of the supports being adapted to engage the front hoop of the drum and having at their upper ends pins detachably seating in said sockets, and the third support being adapted to engage the rear hoop of the drum and having at its upper end a screw-and-slot clamp attaching it to the table and permitting adjustment on the table widthwise thereof.

GEORGE H. WAY.